United States Patent
Zhuang et al.

(10) Patent No.: US 9,495,661 B2
(45) Date of Patent: Nov. 15, 2016

(54) EMBEDDABLE CONTEXT SENSITIVE CHAT SYSTEM

(71) Applicants: Yuchao Zhuang, San Francisco, CA (US); Genesis Kim, San Francisco, CA (US)

(72) Inventors: Yuchao Zhuang, San Francisco, CA (US); Genesis Kim, San Francisco, CA (US)

(73) Assignee: Sparxo, Inc, San Francisco, CA (US)

( * ) Notice: Subject to any disclaimer, the term of this patent is extended or adjusted under 35 U.S.C. 154(b) by 462 days.

(21) Appl. No.: 13/622,832

(22) Filed: Sep. 19, 2012

(65) Prior Publication Data

US 2013/0080928 A1    Mar. 28, 2013

Related U.S. Application Data

(60) Provisional application No. 61/538,943, filed on Sep. 26, 2011.

(51) Int. Cl.

| | |
|---|---|
| G06F 3/048 | (2013.01) |
| G06Q 10/10 | (2012.01) |
| H04L 12/18 | (2006.01) |
| H04L 12/58 | (2006.01) |
| H04N 21/4786 | (2011.01) |
| H04N 21/4788 | (2011.01) |
| G06Q 30/02 | (2012.01) |

(52) U.S. Cl.
CPC ......... *G06Q 10/107* (2013.01); *H04L 12/1822* (2013.01); *H04L 12/581* (2013.01); *H04L 12/5805* (2013.01); *H04N 21/4786* (2013.01); *H04N 21/4788* (2013.01); *G06Q 30/0241* (2013.01)

(58) Field of Classification Search
CPC ........... H04L 12/518; H04L 29/08072; H04L 29/0899; H04L 51/046; H04L 12/1813; H04L 51/32; G06Q 10/10; G06Q 10/107; G06Q 50/01; G06Q 30/02; G06Q 30/0631
USPC ................ 715/751, 753, 760, 764, 781, 758
See application file for complete search history.

(56) References Cited

U.S. PATENT DOCUMENTS 7,263,526 B1 *   8/2007  Busey ................. H04L 12/1813
8,341,529 B1 *  12/2012  Li et al. ........................ 715/741

(Continued)

*Primary Examiner* — Tadeese Hailu
(74) *Attorney, Agent, or Firm* — Peter Tormey; Antero & Tormey, PC; Shiravn Jacob

(57) ABSTRACT

A system and method including a networked processor with a chat management engine operative to embed one or more context sensitive chat widgets in a web page and receive chat messages from the widgets, wherein the messages are associated with a web page context. The system may be further operable to exchange those messages among a plurality of users and determine a sentiment value for those chat messages. In some embodiments a promo engine may modify a web page in response to the sentiment value. For example and without limitation, altering the price for a product or service, adding a product or service, or removing a product or service. Dynamic demographic congregations may be formed that allow for trigger based advertising at a predetermined sentiment value, times or event. Some embodiments provide for coupling to social networks.

13 Claims, 11 Drawing Sheets

(56) References Cited

U.S. PATENT DOCUMENTS

| | | | |
|---|---|---|---|
| 9,129,008 B1* | 9/2015 | Kuznetsov | G06F 17/30616 |
| 2003/0195928 A1* | 10/2003 | Kamijo | H04L 12/1818 |
| | | | 709/204 |
| 2005/0198124 A1* | 9/2005 | McCarthy | H04L 51/16 |
| | | | 709/203 |
| 2008/0034040 A1* | 2/2008 | Wherry | G06Q 10/107 |
| | | | 709/204 |
| 2008/0215589 A1* | 9/2008 | Elhaik | G06F 17/30899 |
| 2009/0055369 A1* | 2/2009 | Phillips | G06F 17/30867 |
| 2009/0222551 A1* | 9/2009 | Neely | G06Q 30/02 |
| | | | 709/224 |
| 2009/0248484 A1* | 10/2009 | Surendran et al. | 705/10 |
| 2010/0082751 A1* | 4/2010 | Meijer et al. | 709/206 |
| 2010/0107088 A1* | 4/2010 | Hunt et al. | 715/752 |
| 2010/0205541 A1* | 8/2010 | Rapaport | G06Q 10/10 |
| | | | 715/753 |
| 2010/0205544 A1* | 8/2010 | Brzeski et al. | 715/758 |
| 2011/0185025 A1* | 7/2011 | Cherukuri | H04L 12/1813 |
| | | | 709/206 |
| 2012/0005224 A1* | 1/2012 | Ahrens et al. | 707/769 |
| 2012/0042263 A1* | 2/2012 | Rapaport | G06Q 50/01 |
| | | | 715/753 |
| 2012/0278064 A1* | 11/2012 | Leary et al. | 704/9 |
| 2012/0290399 A1* | 11/2012 | England | G06Q 30/0282 |
| | | | 705/14.66 |
| 2013/0262574 A1* | 10/2013 | Cohen | G06F 17/2765 |
| | | | 709/204 |

\* cited by examiner

EMBEDDABLE CONTEXT SENSITIVE CHAT SYSTEM

PRIORITY

This application claims the benefit of provisional application No. 61/538,943, entitled "On Demand Based Embeddable Context Sensitive Chat System" by inventor Yuchao Zhuang, filed on Sep. 26, 2011 which is incorporate by reference as if fully set forth herein.

BACKGROUND

Current online chat systems offer instantaneous transmission of text-based messages from sender to receiver through the Internet. Chat systems may involve direct communications between individuals, or may involve group communications, wherein communication occurs from one sender to many receivers. Chat services can either be implemented by the site owners themselves, or by third party service providers. In the latter case, a piece of script is usually embedded in the site owner's page to asynchronously request services from third party service providers. However, these chat client providers operate based on a global site structure models that do not take scope into account. The communication is usually achieved through a centralized chat room where all concurrent users on the site have access to, regardless of their respective virtual address based on the URL. An improvement over existing chat systems would be an embeddable chat system that would take such concepts into account.

SUMMARY

Disclosed herein is a system and method including a networked processor with a chat management engine operative to embed one or more context sensitive chat widgets in a web page. A context sensitive chat widget may provide for specific instances of a chat session associated with the web page item of interest. Certain web pages may have multiple chat sessions depending on the items of interest on the page.

The system may be further operable to receive chat messages from the widgets, wherein the messages are associated with a web page context, exchange those messages among a plurality of users and determine a sentiment value for those chat messages.

When vendors integrate a given portion of code into their websites, it will pull the interactive chat widget code and execute it in a user's browser every time when they visit the vendor's website. After the code is executed by the user selecting a product or service on the web page, a chat widget may slide up from the right bottom corner on the browser display. By clicking on the chat widget, a chat room will be created on demand to allow the site visitors to communicate with each other anonymously. System servers may be responsible for hosting the chat and analytics services. Each message the user generates may be sent to the servers. The servers then process each message using sentiment and other analytic algorithms.

Certain embodiments may employ a promotional (Promo) engine to modify a web page in response to the sentiment value. For example and without limitation altering the price for a product or service, adding a product or service, or removing a product or service. Dynamic demographic congregations may be formed around the web page context that allow for trigger-based advertising at a predetermined sentiment value, time or event.

The construction and method of operation of the invention, however, together with additional objectives and advantages thereof will be best understood from the following description of specific embodiments when read in connection with the accompanying drawings.

DESCRIPTION

Generality of Invention

Figure 1:
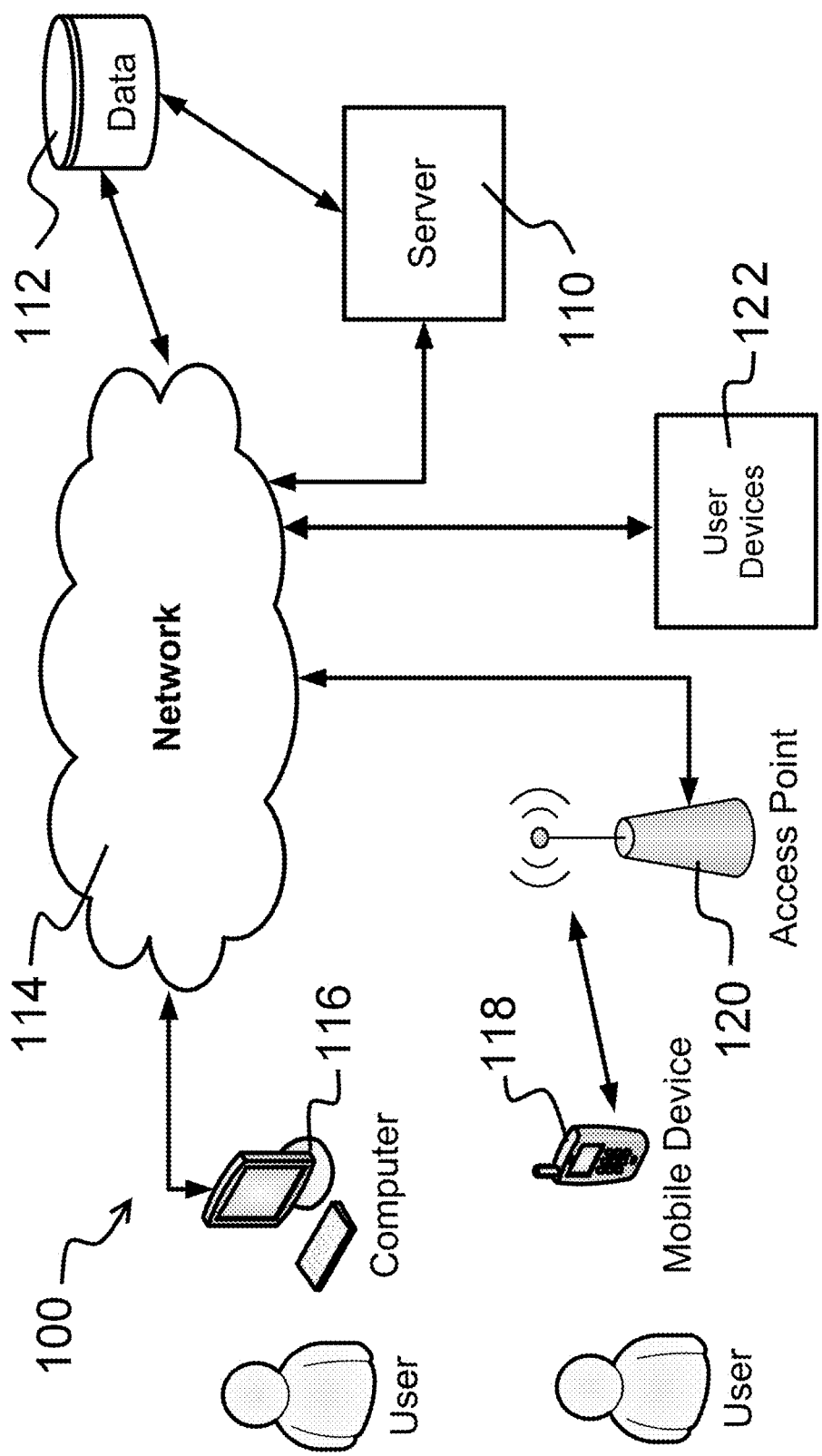
FIG. 1 shows a functional block diagram of a client server system that may be employed for some embodiments according to the current disclosure.

This application should be read in the most general possible form. This includes, without limitation, the following:

References to specific techniques include alternative and more general techniques, especially when discussing aspects of the invention, or how the invention might be made or used.

References to "preferred" techniques generally mean that the inventor contemplates using those techniques, and thinks they are best for the intended application. This does not exclude other techniques for the invention, and does not mean that those techniques are necessarily essential or would be preferred in all circumstances.

References to contemplated causes and effects for some implementations do not preclude other causes or effects that might occur in other implementations.

References to reasons for using particular techniques do not preclude other reasons or techniques, even if completely contrary, where circumstances would indicate that the stated reasons or techniques are not as applicable.

Furthermore, the invention is in no way limited to the specifics of any particular embodiments and examples disclosed herein. Many other variations are possible which remain within the content, scope and spirit of the invention, and these variations would become clear to those skilled in the art after perusal of this application.

Lexicography

The term "declarative language" generally refers to a programming language that allows programming by defining the boundary conditions and constraints and letting the computer determine a solution that meets these requirements. Many languages applying this style attempt to minimize or eliminate side effects by describing what the program should accomplish, rather than describing how to go about accomplishing it. This is in contrast with imperative programming, which requires an explicitly provided algorithm.

The term "HTML Injection" generally refers to injecting HTML code into a web server's response to alter the content to the end user. This is also known as cross site scripting.

The term "host machine" generally refers to a single processor-based machine that includes the elements of the system under discussion. However, this disclosure should not be read to limited a host machine in that manner when one having skill in the art will recognize that one or more of those elements may be performed remotely.

The term "extension" and "browser extension" and the like generally refer to a computer program, applet or instructions that extend the functionality of a web browser in some way. Depending on the browser, the term may be distinct from similar terms such as plug-in or add-on.

The terms "software as a service" or "SaaS" or "on-demand software" generally mean a software delivery model in which software and its associated data are hosted centrally such as on the Internet or cloud and accessed by users using a client. SaaS is a common delivery model for many business applications, including accounting, collaboration, customer relationship management (CRM), management information systems (MIS), enterprise resource planning (ERP), invoicing, human resource management (HRM), content management (CM) and service desk management.

The term "structured data" generally refers to data stored in a meaningful fashion such that a processor may be instructed to access the data. Examples include but are not limited to databases, relational databases, text files, XML file and the like.

The word "Middleware" generally means computer software that connects software components or applications. The software consists of a set of enabling services that allow multiple processes running on one or more machines to interact across a network. Middleware conventionally provides for interoperability in support of complex, distributed applications. It often includes web servers, application servers, and similar tools that support application development and delivery such as XML, SOAP, and service-oriented architecture.

The term "virtual machine" or "VM" generally refers to a self-contained operating environment that behaves as if it is a separate computer even though it is part of a separate computer or may be virtualized using resources form multiple computers.

The terms "widget," "control" and the like generally refer to an application, or a component of an interface, that enables a user to perform a function or access a service.

The acronym "XML" generally refers to the Extensible Markup Language. It is a general-purpose specification for creating custom markup languages. It is classified as an extensible language because it allows its users to define their own elements. Its primary purpose is to help information systems share structured data, particularly via the Internet, and it is used both to encode documents and to serialize data.

DETAILED DESCRIPTION

Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

System Elements

Processing System

The methods and techniques described herein may be performed on a processor based device. The processor based device will generally comprise a processor attached to one or more memory devices or other tools for persisting data. These memory devices will be operable to provide machine-readable instructions to the processors and to store data. Certain embodiments may include data acquired from remote servers. The processor may also be coupled to various input/output (I/O) devices for receiving input from a user or another system and for providing an output to a user or another system. These I/O devices may include human interaction devices such as keyboards, touch screens, displays and terminals as well as remote connected computer systems, modems, radio transmitters and handheld personal communication devices such as cellular phones, "smart phones", digital assistants and the like.

The processing system may also include mass storage devices such as disk drives and flash memory modules as well as connections through I/O devices to servers or remote processors containing additional storage devices and peripherals.

Certain embodiments may employ multiple servers and data storage devices thus allowing for operation in a cloud or for operations drawing from multiple data sources. The inventor contemplates that the methods disclosed herein will also operate over a network such as the Internet, and may be effectuated using combinations of several processing devices, memories and I/O. Moreover any device or system that operates to effectuate techniques according to the current disclosure may be considered a server for the purposes of this disclosure if the device or system operates to communicate all or a portion of the operations to another device.

The processing system may be a wireless device such as a smart phone, personal digital assistant (PDA), laptop, notebook and tablet computing devices operating through wireless networks. These wireless devices may include a processor, memory coupled to the processor, displays, keypads, WiFi, Bluetooth, GPS and other I/O functionality. Alternatively the entire processing system may be self-contained on a single device.

The methods and techniques described herein may be performed on a processor based device. The processor based device will generally comprise a processor attached to one or more memory devices or other tools for persisting data. These memory devices will be operable to provide machine-readable instructions to the processors and to store data, including data acquired from remote servers. The processor will also be coupled to various input/output (I/O) devices for receiving input from a user or another system and for providing an output to a user or another system. These I/O devices include human interaction devices such as keyboards, touchscreens, displays, pocket pagers and terminals as well as remote connected computer systems, modems, radio transmitters and handheld personal communication devices such as cellular phones, "smart phones" and digital assistants.

The processing system may also include mass storage devices such as disk drives and flash memory modules as well as connections through I/O devices to servers containing additional storage devices and peripherals. Certain embodiments may employ multiple servers and data storage devices thus allowing for operation in a cloud or for operations drawing from multiple data sources. The inventor contemplates that the methods disclosed herein will operate over a network such as the Internet, and may be effectuated using combinations of several processing devices, memories and I/O.

The processing system may be a wireless device such as a smart phone, personal digital assistant (PDA), laptop, notebook and tablet computing devices operating through wireless networks. These wireless devices may include a processor, memory coupled to the processor, displays, keypads, WiFi, Bluetooth, GPS and other I/O functionality.

In general, the routines executed to implement the current disclosure, may be implemented as part of an operating system or a specific application, component, program, object, module or sequence of instructions referred to as "computer programs," apps, widgets, and the like. The computer programs typically comprise one or more instructions set at various times in various memory and storage devices in a computer, and that, when read and executed by one or more processors in a computer, cause the computer to perform operations necessary to execute elements involving the various aspects of the invention. Moreover, while the invention has been described in the context of fully functioning computers and computer systems, those skilled in the art will appreciate that the various embodiments are capable of being distributed as a program product in a variety of forms, and that the current disclosure applies equally regardless of the particular type of machine or computer-readable media used to actually effect the distribution. Examples of computer-readable media include but are not limited to recordable type media such as volatile and non-volatile memory devices, floppy and other removable disks, hard disk drives, optical disks (e.g., Compact Disk Read-Only Memory (CD ROMS), Digital Versatile Disks, (DVDs), etc.), among others, and transmission type media such as digital and analog communication links.

Client Server Processing

FIG. 1 shows a functional block diagram of a client server system 100 that may be employed for some embodiments according to the current disclosure. In the FIG. 1 a server 110 is coupled to one or more databases 112 and to a network 114. The network may include routers, hubs and other equipment to effectuate communications between all associated devices. A user accesses the server by a computer 116 communicably coupled to the network 114. The computer 116 includes a sound capture device such as a microphone (not shown). Alternatively the user may access the server 110 through the network 114 by using a smart device such as a telephone or PDA 118. The smart device 118 may connect to the server 110 through an access point 120 coupled to the network 114. The mobile device 118 includes a sound capture device such as a microphone.

Conventionally, client server processing operates by dividing the processing between two devices such as a server and a smart device such as a cell phone or other computing device. The workload is divided between the servers and the clients according to a predetermined specification. For example in a "light client" application, the server does most of the data processing and the client does a minimal amount of processing, often merely displaying the result of processing performed on a server.

According to the current disclosure, client-server applications are structured so that the server provides machine-readable instructions to the client device and the client device executes those instructions. The interaction between the server and client indicates which instructions are transmitted and executed. In addition, the client may, at times, provide for machine readable instructions to the server, which in turn executes them. Several forms of machine readable instructions are conventionally known including applets and are written in a variety of languages including Java and JavaScript.

Client-server applications also provide for software as a service (SaaS) applications where the server provides software to the client on an as needed basis.

In addition to the transmission of instructions, client-server applications also include transmission of data between the client and server. Often this entails data stored on the client to be transmitted to the server for processing. The resulting data is then transmitted back to the client for display or further processing.

One having skill in the art will recognize that client devices may be communicably coupled to a variety of other devices and systems such that the client receives data directly and operates on that data before transmitting it to other devices or servers. Thus data to the client device may come from input data from a user, from a memory on the device, from an external memory device coupled to the device, from a radio receiver coupled to the device or from a transducer coupled to the device. The radio may be part of a wireless communications system such as a "WiFi" or Bluetooth receiver. Transducers may be any of a number of devices or instruments such as thermometers, pedometers, health measuring devices and the like.

A client-server system may rely on "engines" which include processor-readable instructions (or code) to effectuate different elements of a design. Each engine may be responsible for differing operations and may reside in whole or in part on a client, server or other device. As disclosed herein a display engine, a data engine, an execution engine, a user interface (UI) engine, a promo engine, a sentiment engine, and the like may be employed. These engines may seek and gather information about events from remote data sources and control functionality locally and remotely.

References in the specification to "one embodiment", "an embodiment", "an example embodiment", etc., indicate that the embodiment described may include a particular feature, structure or characteristic, but every embodiment may not necessarily include the particular feature, structure or characteristic. Moreover, such phrases are not necessarily referring to the same embodiment. Further, when a particular feature, structure or characteristic is described in connection with an embodiment, it is submitted that it is within the knowledge of one of ordinary skill in the art to effect such feature, structure or characteristic in connection with other embodiments whether or not explicitly described. Parts of the description are presented using terminology commonly employed by those of ordinary skill in the art to convey the substance of their work to others of ordinary skill in the art.

Context Sensitive Chat

Figure 2:
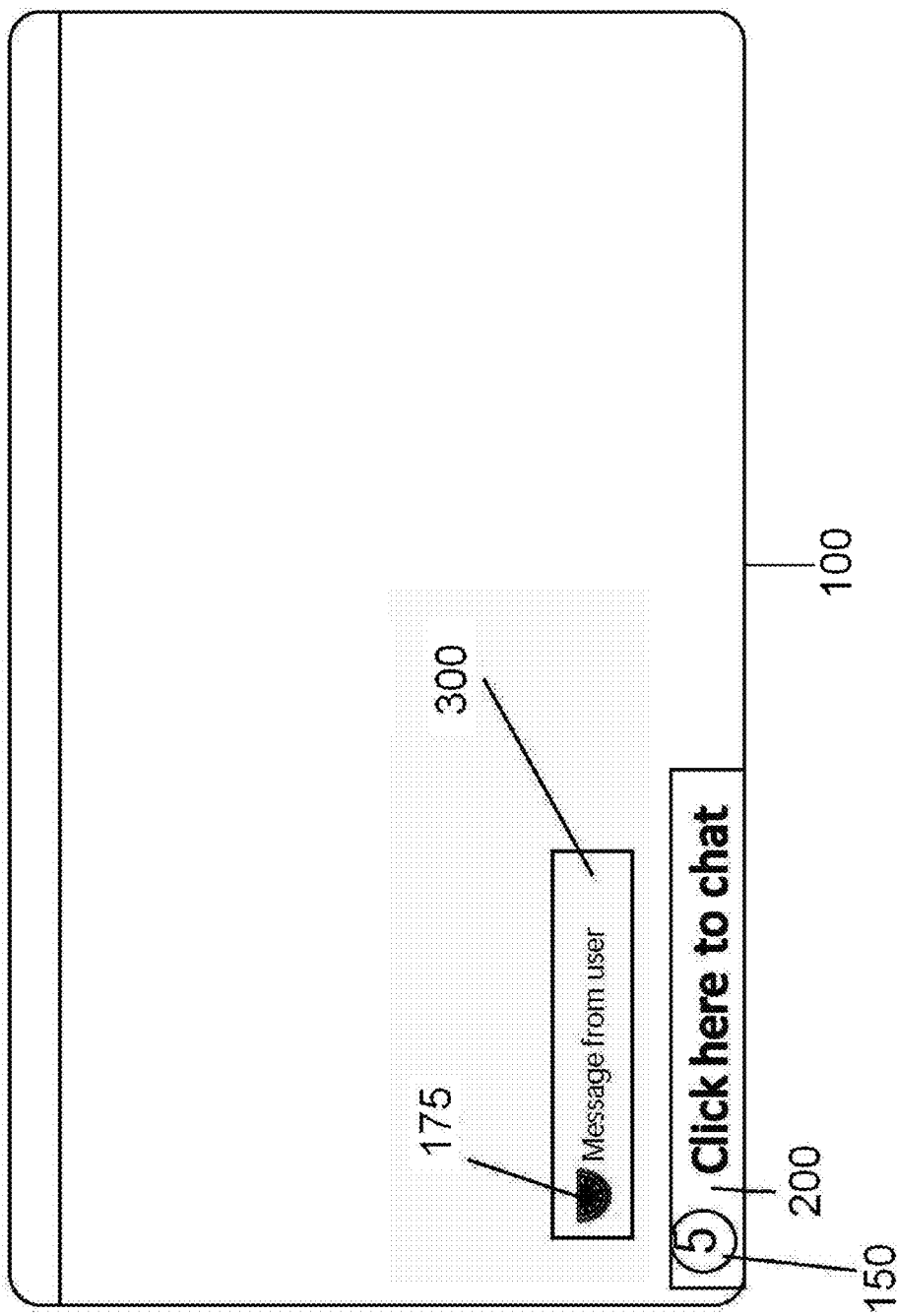
FIG. 2 shows one possible user interface for an embeddable context sensitive chat system.

FIG. 2 shows one possible user interface for an embeddable context sensitive chat system. The embeddable context sensitive chat system may include a web browser 100 with a visual display element ("chat bar") 200. The chat bar 200 may appear when the user visits a predetermined website that has the chat system enabled. A message counter 150 may indicate how many messages have been received and a portion of the display may show a message from a user 300. When a user submits a message (posts), the message may be enclosed in a box or other indicia which slides up from bottom up from the chat bar 200. In certain embodiments, a random icon 175 may be assigned to users for identification purpose.

One having skill in the art will appreciate that conventional programming tools and languages such as Java, HTML and the like may be employed to effectuate the current disclosure. In particular HTML injection, browsers extensions and "plug-ins" may be used.

Figure 3:
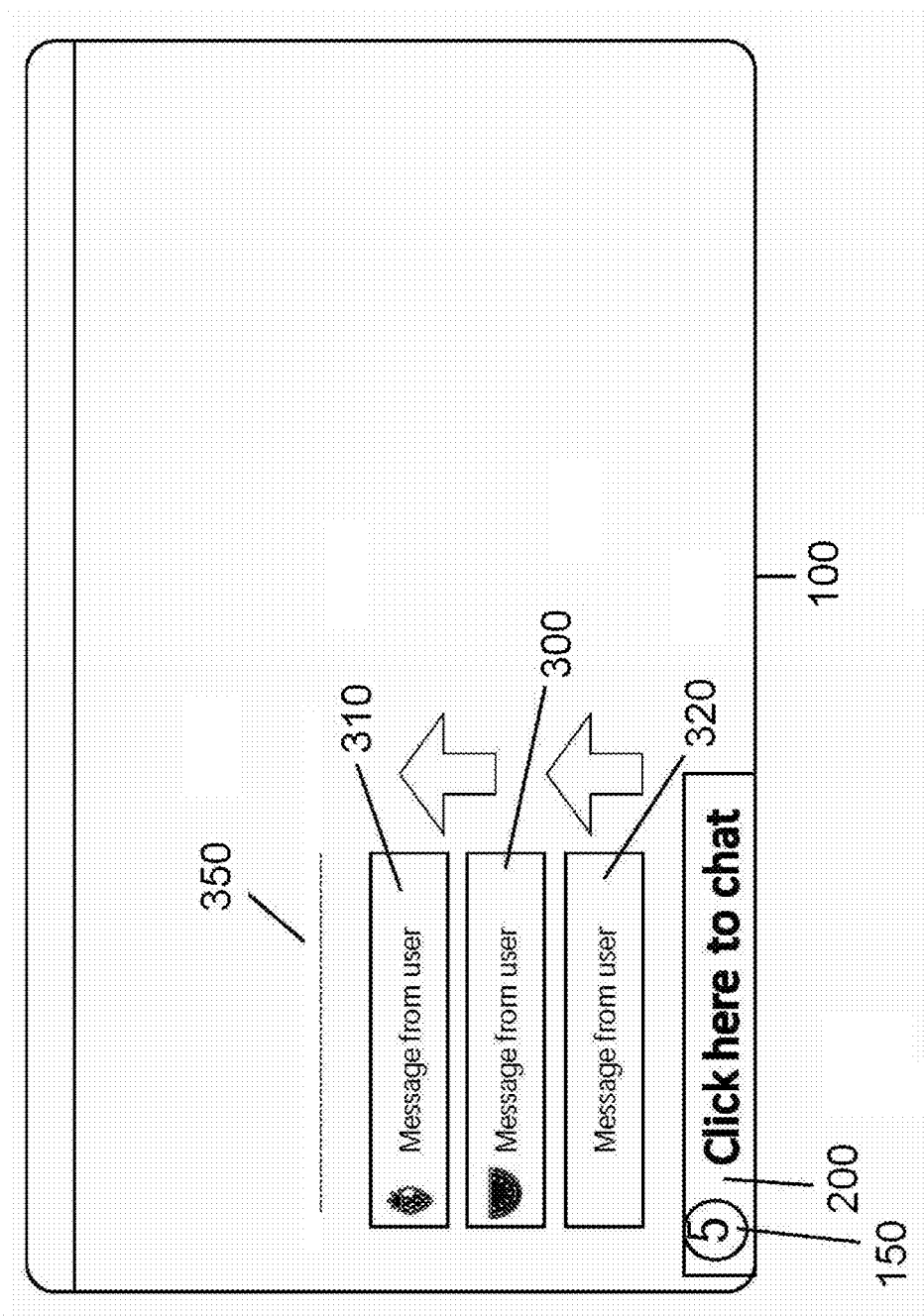
FIG. 3 shows a diagram of how chat messages may appear.

FIG. 3 shows a diagram of how chat messages 300, 310, 320 may appear. As indicated by the directional arrows within the FIG. 3, the messages 300, 310, 300 will scroll upwards from the chat bar 200. As users type additional messages in, the messages will appear below the existing messages 300, 310, 320. In addition, the message counter 150, will increment accordingly with the amount of message that have been received. Each subsequent message may float up and hide once they reach a predetermined height such as that indicated by the dotted lines 350.

Figure 4:
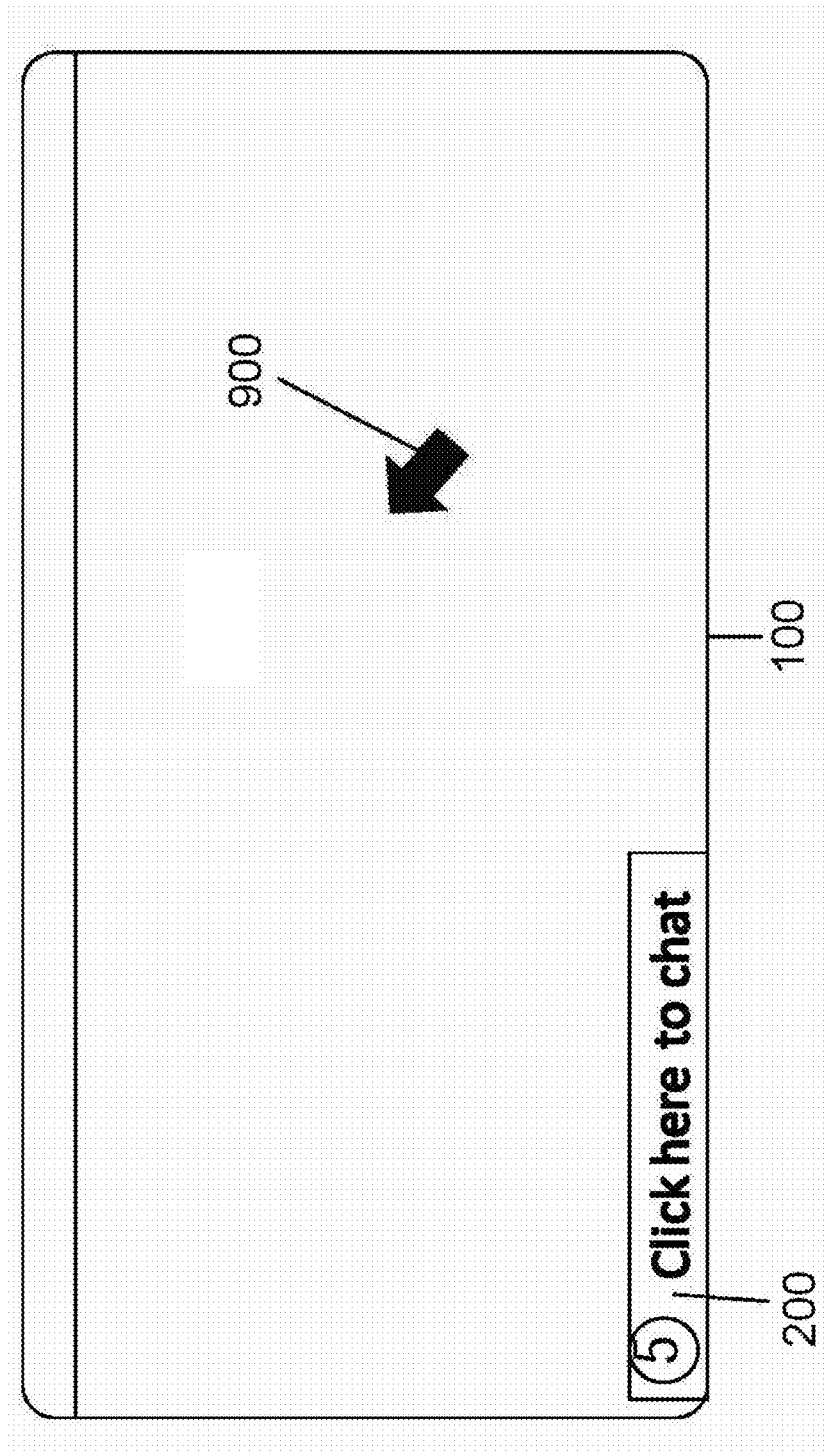
FIG. 4 shows an embeddable context chat system with all messages hidden.

FIG. 4 shows an embeddable context chat system with all messages hidden. In operation, when a user clicks or otherwise selects any area on the browser outside of the chat area, the embedded chat system will hide any messages and minimize its appearance to the chat bar 200.

One having skill in the art will appreciate that that chat bar and associated messages may be effected both as an anchored window and as a floating window allowing a user to position it or size it to meet any user requirements.

Figure 5:
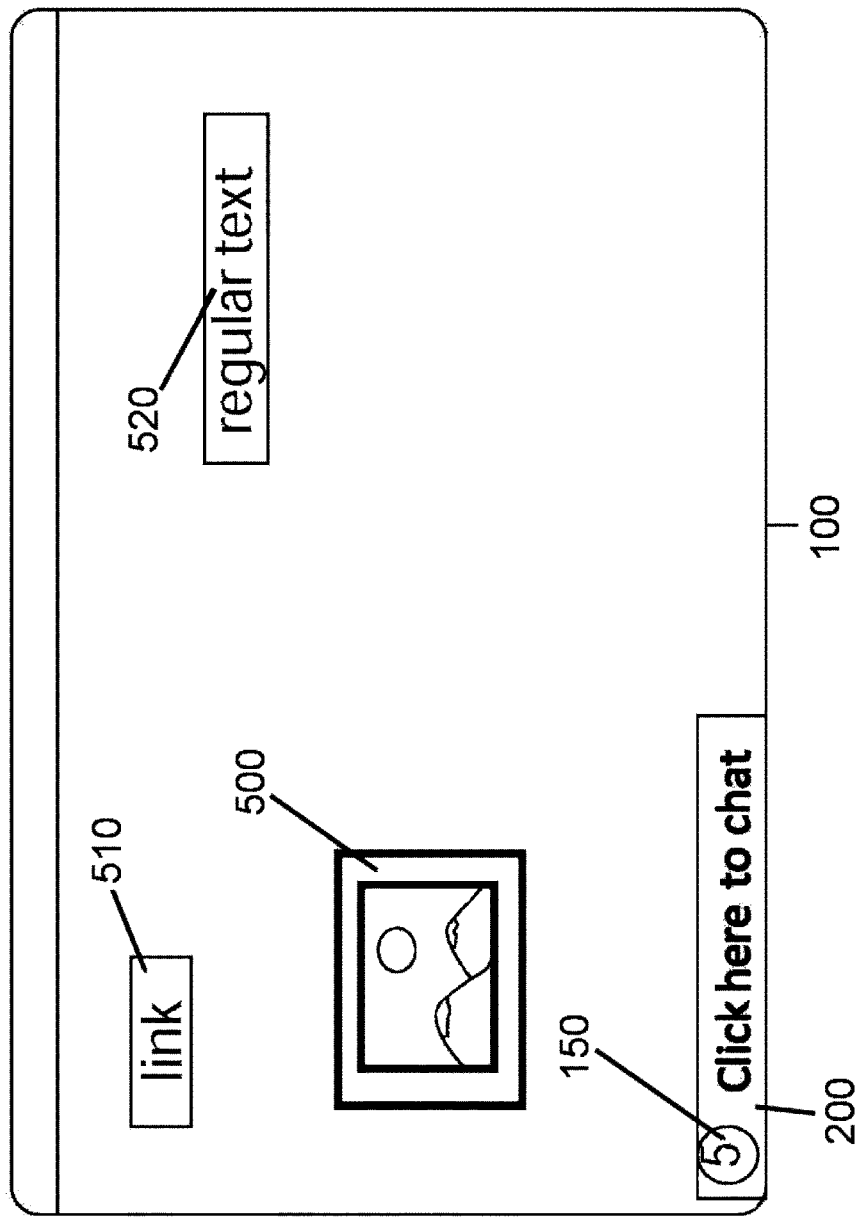
FIG. 5 of the drawings shows an embodiment of item-specific chat threads.

FIG. 5 of the drawings shows an embodiment of item-specific chat threads. A user may chat based on a specific item on a web page including an image 500, a hyper-link 510, a specific text that appears on a web page 520, and the like. The user may click on or otherwise select on any of the items 500, 510, 520, and a message box will appear near where the item is clicked. Certain embodiments will extract unique identifiers for these items 500, 510, 520 and store them in a structured data store such as a database. Should an item be updated, changed, or deleted, the embedded chat system may update any of the messages associated with those items. In other embodiments instead of utilizing a mouse pointer to click on specific items, a user may instead indicate specific items by finger tapping or utilizing other types of hand gestures.

In certain embodiments if a user finds a particular topic interesting, they can drag and drop the message counter 150 to a region of the screen to participate in the location-based chat. In location-based chat a dialogue box with a user input may appear thus allowing a user to see messages and enter messages on the topic related to the item at that location. Once the user clicks off that location of interest, the chat area dialogue box will hide (or minimize).

Figure 6:
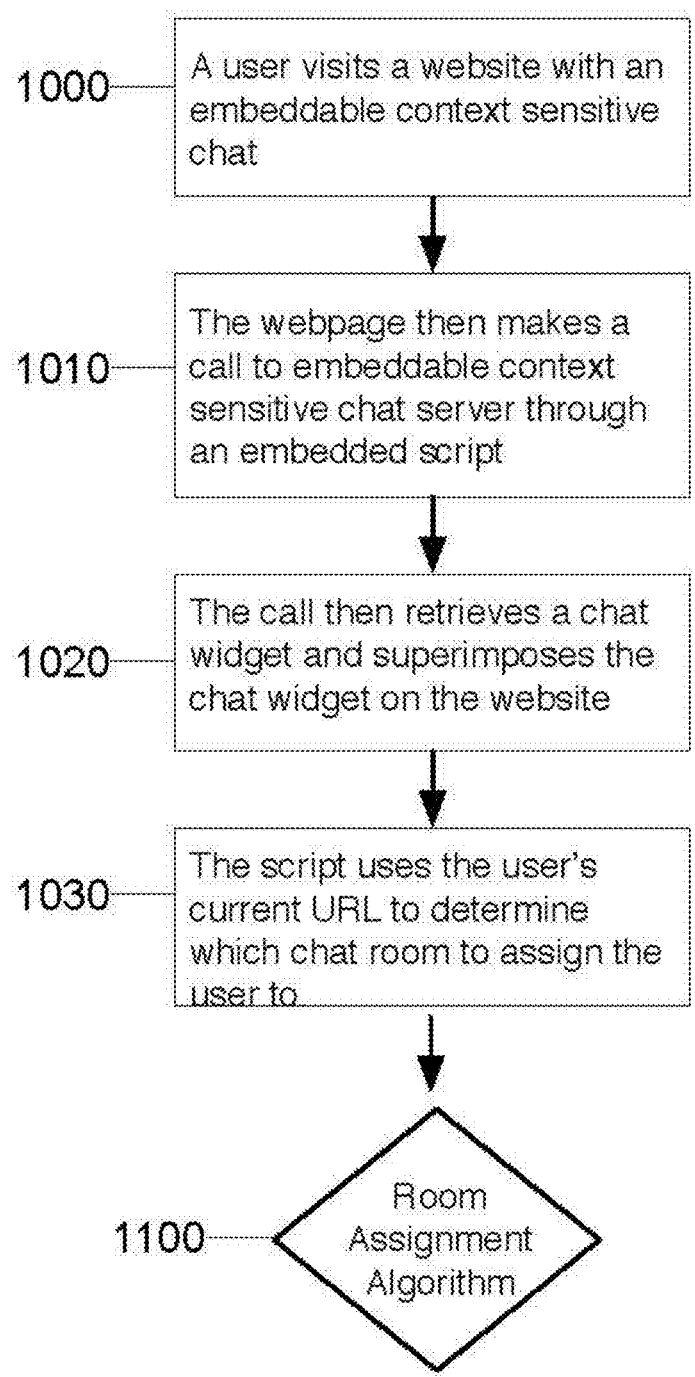
FIG. 6 of the drawing shows a high-level flow chart of elements which may be found in an embeddable context chat system.

FIG. 6 of the drawing shows a high-level flow chart of elements which may be found in an embeddable context chat system. At a step 1000 a user visits a website with an embeddable context chat system. At a step 1010 a webpage within the website which the user visits will make a call to an embeddable context chat system server through an embedded script. At a step 1020 the embedded script retrieves a chat widget and superimposes the chat widget on the website. At a step 1030 the script detects the user's current URL and utilizes it to determine which chat room to assign the user to.

Figure 7:
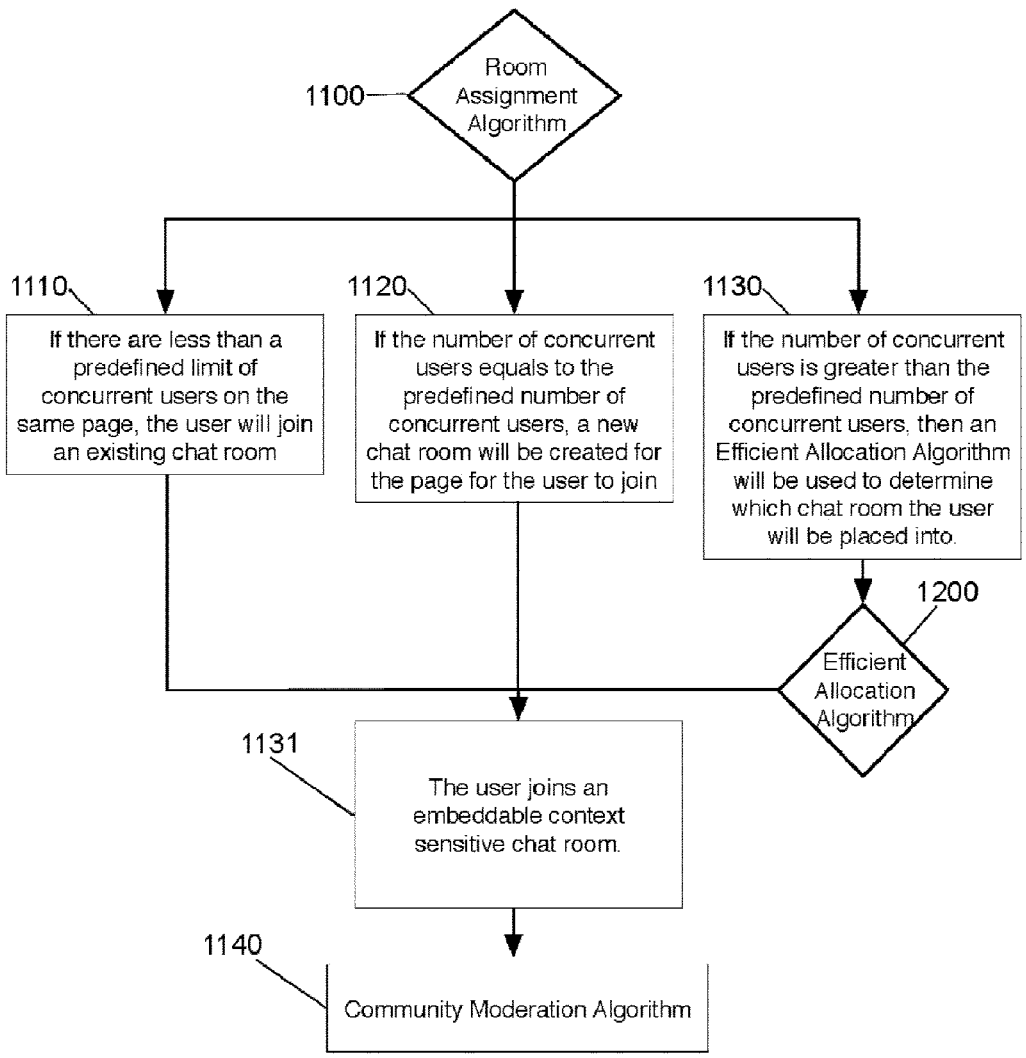
FIG. 7 of the drawings show a high-level flow chart of a method to assign users to a specific chat room.

FIG. 7 of the drawings show a high-level flow chart of a method to assign users to a specific chat room. Users may only send and receive messages among members within a chat room. There may be more than one chat room on a page. The method begins at a flow label 1100. A newly arriving user will automatically join a chat room in response to various settings and factors. If the number of concurrent users is less than a predetermined amount, the flow moves to a step 1110. If the number of concurrent users is equal to a predetermined amount, the flow moves to a step 1120. And if the number of concurrent users is greater than a predetermined amount, the flow moves to a step 1130. At the step 1130 the flow moves to a step 1200 for operation of efficient allocation algorithm. At a step 1131 the user is joined to a embeddable context sensitive chat room. At a step 1140 community moderation is performed (infra).

For example and without limitation, the number of users in a chat room may be a function of the number of concurrent users at any given time. The flow chart of FIG. 7 may be utilized to determine the number of users within each chat room. In this example there will be a maximum limit of users within each chat room. Depending on how many current concurrent users there are and what the maximum limit is, the user may be assigned to different chat rooms. If the current concurrent user count within the chat system has not reached the aforementioned limit, then the user will be assigned to an existing chat room. If the number equals or exceeds a predetermined maximum limit, then either a new chat room will be created or the user may be assigned to an existing, yet open, chat room. After the user has been assigned a chat room, communications (or posts) in that chat room are limited to those who have also joined that chat room.

Chat Moderation

A community moderation algorithm may be used to screen messages between users within the chat room. Chat room management may be effectuated using both page user limits and chat room user limits. For example and without limitation, if a group of users communicates with a user within a chat room and the user becomes abusive then any of the users may filter out messages from the abusive user. The filtering is accomplished through a community moderation algorithm which may maintain a list of users who have indicated that they wish to filter out communications from the abusive user. Communications between the abusive user and the other users may first go through the community moderation before being sent to the chat room. Any user that elects to filter out the contents of the abusive user will not receive any communication, as community moderation will prevent that communication from going over to the users. Furthermore, the users may elect to completely ban the abusive user from any communication. If this occurs, then any communication from the abusive user will be stopped by community moderation.

In certain embodiments community moderation may be effectuated automatically by analyzing keywords or other sentiment indicator (infra) that would trigger a limitation on that specific user.

One having skill in the art will recognize that certain communications may not be text and may instead be formed as icons, emoticons and other graphical images. In some embodiments images, or collections of characters that effect an image may convey sentiment value.

System Operation

Figure 8:
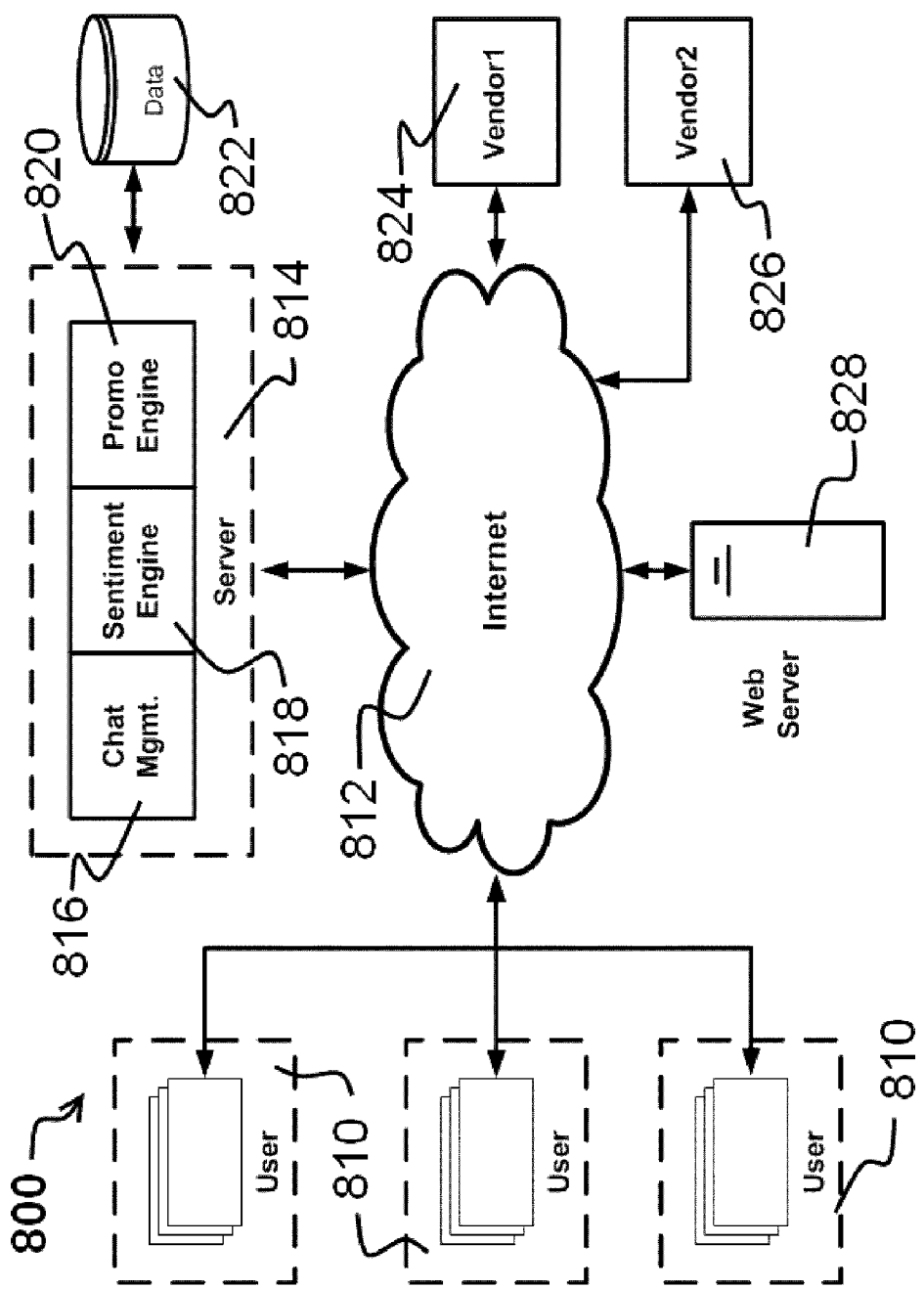
FIG. 8 shows a system that may be employed for certain embodiments of the current disclosure.

FIG. 8 shows a system 800 that may be employed for certain embodiments of the current disclosure. In FIG. 8 one or more users 810 are coupled to the Internet 812. Further coupled to the Internet is a server 814. The server includes a chat management engine 816, a sentiment engine 818 and a promo engine 820. The server 814 is further coupled to a structured data source 822. Also coupled to the Internet 812 is at least one web server 828 and one or more vendors 824 and 826.

In operation an embodiment may operate by injecting code into web pages delivered by the web server 828 to the users 810. The code segments would provide a widget to track user's interactions with the delivered web page. When a user 810 is interested in a product or service, the user 810 indicates this preference and the widget provides a chat tool as described herein (supra). The chat management engine 816 facilitates the code injection and chat management operations for providing chat sessions that are context sensitive.

During chat sessions the sentiment engine 818 may monitor chat sessions and messaging to determine a level of sentiment for each user and for each congregation. This sentiment indicator provides an immediate value indicator for the target entity. For example and without limitation, a web site may be streaming a video of a live concert. Several congregations may form about the live concert, each having an exchange of chat messages concerning a particular song. Sentiment analysis gives immediate feedback, in a small set of easy to understand numbers, of the user's feelings about that particular song. Moreover, an average sentiment value may be determined throughout the entire concert, and deviations from the average may indicate congregation's preferences for certain songs over others. In keeping with this example, a music producer, producing a live album of the concert, may use the sentiment value for each song to gauge whether or not to include a particular song on an album, or release one or more of the songs as singles.

Further by way of example a product manager from a vendor 824 may dynamically price a product and measure in a short time, the sentiment change for a specific congregation. Moreover congregations may be formed about similar product, or the same product priced at different points to measure overall sentiment. If a vendor 824 offers a product at a first price and only a small congregation forms, then the vendor may offer new users 810 the same product but at a lower price to see if a larger (or more) congregation forms or if the congregation indicates a higher sentiment value.

Dynamic Demographics

The promo engine 820 may operate to effect changes to the context sensitive entity. The promo engine 820 may change prices on products or offer new products to the congregation. Moreover, the changes might be geared towards creating a larger congregation. For example by changing a color scheme or page placement of a product and the like. The activities of the promo engine 820 may be controlled by predetermined parameters. For example and without limitation, trigger points may be set that relate a product or service offering to a specific sentiment value thus automating operations of the promo engine 820. In response to the sentiment and triggers, some embodiments may:

1. Offer new products and prices to the congregation;
2. Offer price discounts on the context sensitive, and
3. Display one or more advertisements.

Trigger points may include raw or adjusted sentiment indicators, date and time value, social events, sporting events and the like. For example and without limitations triggers may be formed to:

Offer a product for sale when a baseball team hits a home run and sentiment value reaches a predetermined level;

Offer a song for free download when a band is playing that song during a live broadcast and the sentiment reaches a predetermined level;

Decrease a product price when a congregation reaches a predetermined size.

Trigger points may allow for complete automations and coordination between multiple vendors to offer associated products or services in response to certain sentiments. For example and without limitation, a tuxedo rental store may offer a discount when sentiment value for evening gowns reaches a certain point.

One having skill in the art will recognize that although shown separately in FIG. 8, elements of this disclosure may be combined to effectuate the system of FIG. 8. For example and without limitation the server 814, the web server 828 and the vendors 824 and 826 may operate from the same processing device.

Figure 9:
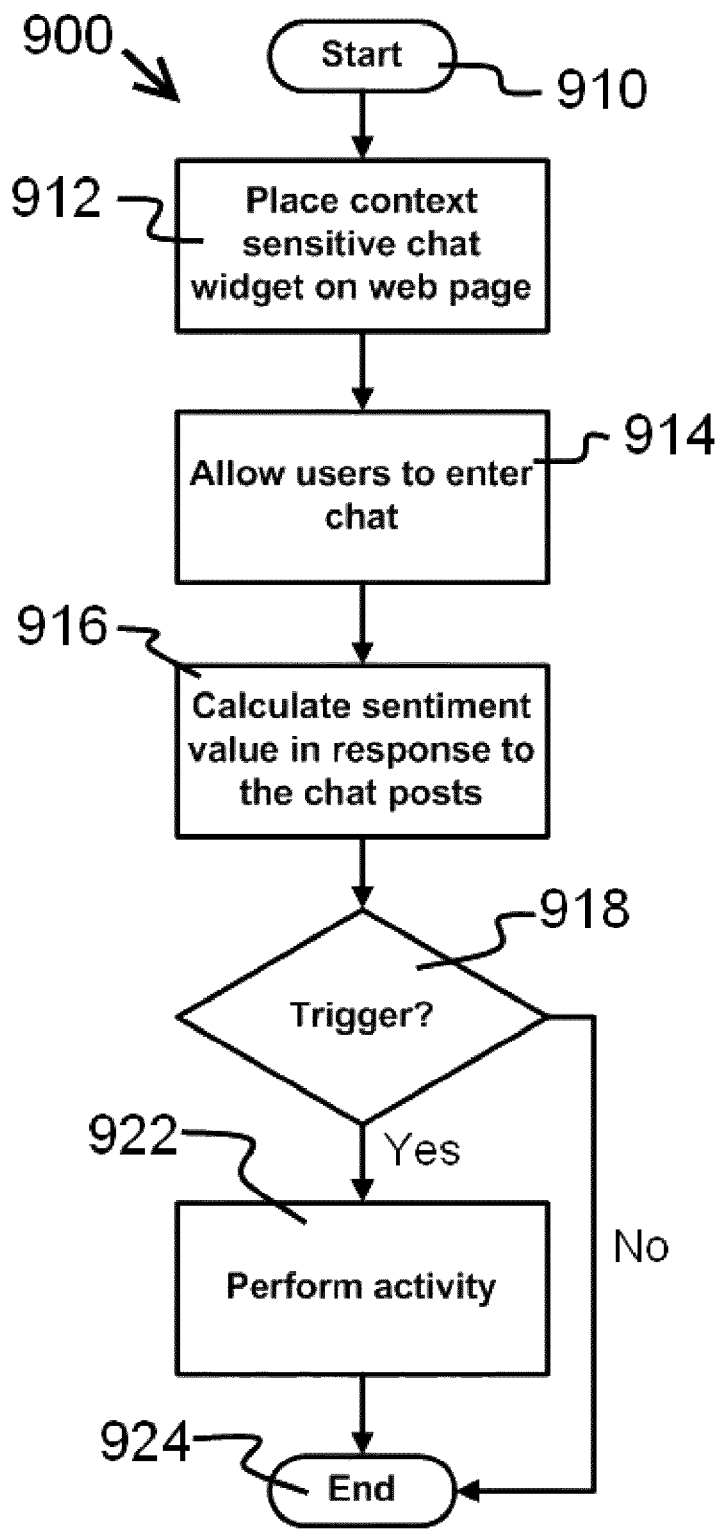
FIG. 9 shows a flowchart a possible embodiment of an embeddable context sensitive chat system.

FIG. 9 shows a flowchart a possible embodiment of an embeddable context sensitive chat system 900. The steps in this method are illustrative only and do not necessary need to be performed in the given order they are presented herein. Some steps may be omitted completely. In FIG. 9 a process starts at a flow label 910. At a step 912 a widget is placed on a web page. The widget is sensitive to entities on the page and allows for a chat session to begin.

At a step 914 users are allowed to enter chat sessions. In some embodiments the users may be authenticated to the system to verify they are human users as opposed to bots.

At a step 916 a sentiment value is calculated for the posts in the chat sessions.

At a step 918 a trigger value is calculated in response to the sentiment value, the context, the entity or some combination thereof. If the trigger is reached, flow proceeds to a step 922. If the trigger is not reached, then flow proceeds to a flow label 924.

At a step 922 an activity is performed in response to the trigger.

At a flow label 924 the method ends.

Chat Operation

Figure 10:
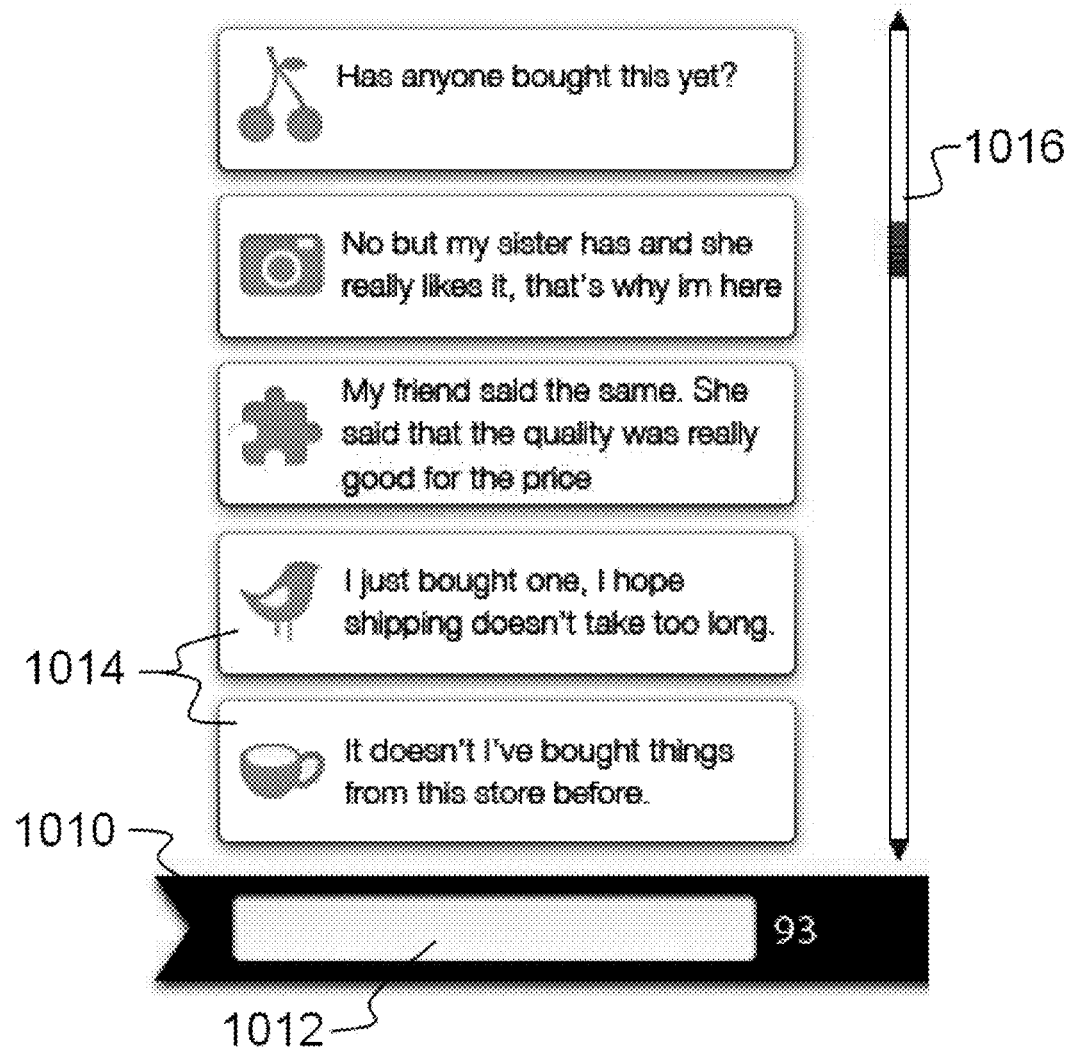
FIG. 10 shows an illustration of an embodiment according to certain aspects of the present disclosure.

FIG. 10 shows an illustration of an embodiment according to certain aspects of the present disclosure. In FIG. 10 a chat widget 1010 is displayed on a screen such as a web browser or other interface. The chat widget 1010 may have a district shape and be operable to display instructions and to receive input from a user in an input area 1012. The chat widget 1010 may also provide indicia representing a number of users (shown as 93 in FIG. 10) or other control information. Each message 1014 is displayed "stacked" on the display according to the age of the message. Some embodiments may include a timestamp on the message, and provide for removal of messages when the poster is no longer involved in the conversations. The messages may have indicia representing the user who posted the message. The indicia may be an icon, photograph or other picture. In some embodiments the user may be coupled to other social networking sites such as Facebook and/or Twitter. This provides for using indicia associated with those social networked sites such as a profile picture. A control 1016, such as a slider allows a user to scroll though the messages.

In operation a user selects a product displayed on the web page (or an associated page) and the chat widget 1010 appears. Along with any chat messages, communications from the organization sponsoring the product or service may also be display. These communications may include special promotional offers. Each chat (or a portion thereof) may be stored for later analysis and further processed to extract sentiment value.

The chat control may be effectuated using discreet controls in Java. For example and without limitations controls such as input boxes and display boxes may be coded to effect a chat control by a chat engine. In addition there are commercially available chat controls which may be employed by a chat engine in some embodiments.

Sentiment Analysis

Sentiment analysis or opinion mining refers to using computational linguistics, and text analytics to identify and extract subjective word and phrases from chat postings. Certain words and sentence structures indicate the attitude of a writer with respect the topic, which might be the product, under discussion.

In some embodiment sentiment analysis includes classifying the polarity of a given text to determine whether or not it is positive, negative, or neutral. Polarity may also include predetermined positive and negative sentiment strength score. This may be effectuated using lookup tables having a relationship between words and sentiment. For example and without limitation, embedded chat messages may be gleaned for words which are then tested against a structured data source to see if there is an associated sentiment value. Total sentiment scores may be aggregated to a particular user. In some embodiments a score per total words value may be calculate to scale sentiment between chatty and less chatty users. A user who simply writes "I like it." could then be relatively compared to a user who writes "This is awesome, I love it!" on their chat messages.

Certain embodiments may employ servers and clients to automate sentiment analysis of embedded chats and identify the appropriate target on the web page. These embodiments may employ conventional techniques such as latent semantic analysis, support vector machines, "bag of words," semantic orientation, and the like.

Figure 11:
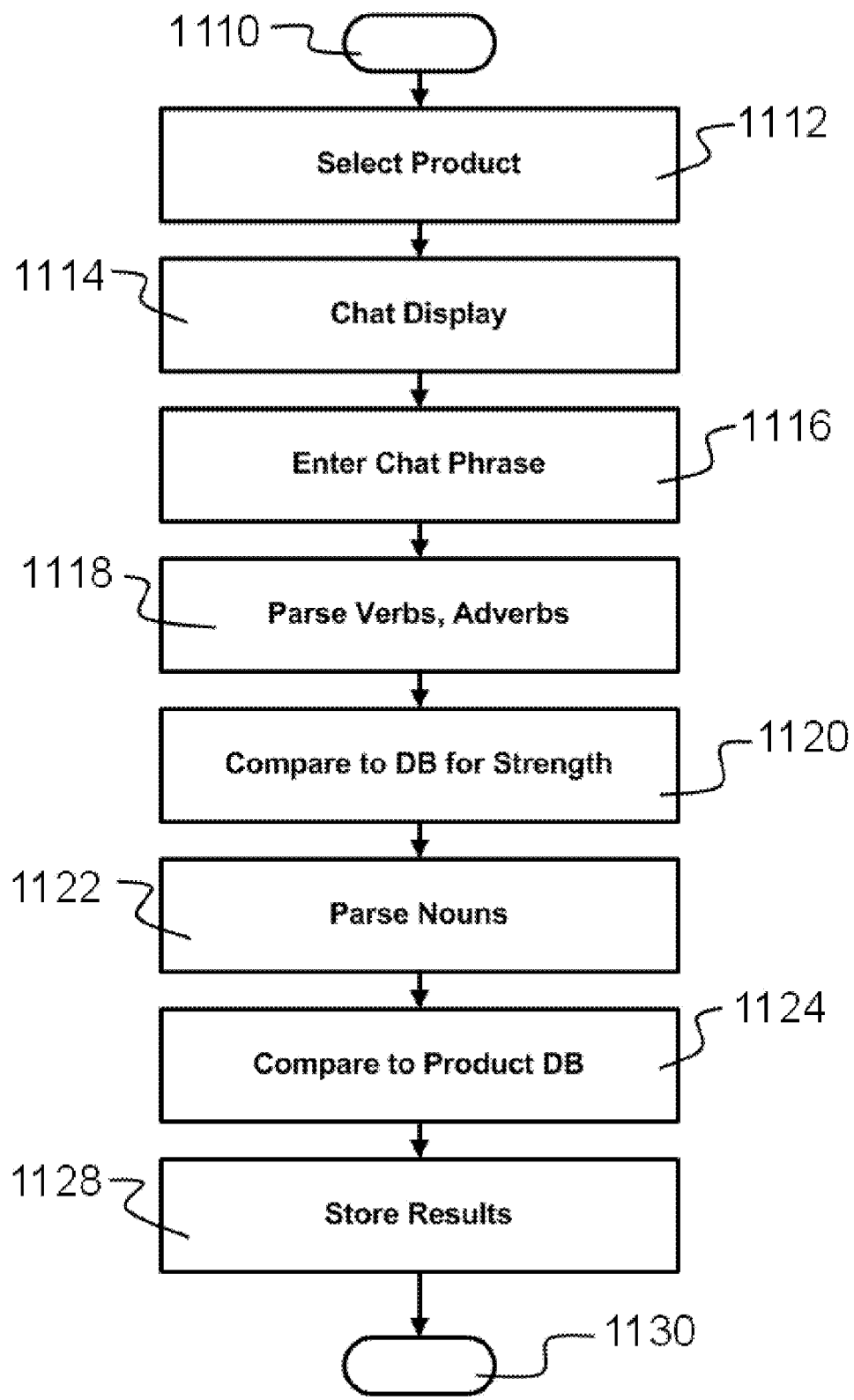
FIG. 11 shows a method that may be employed for sentiment analysis.

FIG. 11 shows a method that may be employed for sentiment analysis. The steps in the method are illustrative only and do not necessary need to be performed in the given order they are presented herein. Some steps may be omitted completely. The method begins at a flow label 1110.

At a step 1112 a user selects a product that is displayed in a browser. Depending on the computing device, the user may right-click to select devices, however different operating systems and devices provide for differing ways to indicate an area of a web page.

At a step 1114 a chat display appears on the user's display. Certain embodiments may provide for multiple chat displays, including multiple displays associated with a single product or service.

At a step 1116 the user enters a phrase or sentence into the chat display. Some embodiments may transmit the text in the chat message to a server for processing, while others may process the chat text locally. In certain embodiments the processing of the chat might be divided along client-server responsibilities such that no one device does all the processing.

At a step 118 the verbs, adverbs and adjectives are parsed out from the chat text.

At a step 1120 the verbs, adverbs and adjectives are compared to information in a structured data source to determine the sentiment strength. For example and without limitation, a word like "like" may be given a certain sentiment value whereas a phrase like "really like" may be given a higher value. The sentiment engine may have different sentiment scales depending on the product or service under discussion. For example and without limitation, if a certain dynamic demographic is apt to communicate with a plethora of highly sentimental words or phrases, but don't actually share a high value of sentiment, then the sentiment engine can be programmed to discount certain words or phrases. In some embodiments a specific lookup table may be employed for specific products or services.

At a step 1122 nouns may be parsed out of the chat text. The nouns may link the sentiment to the specific product or provide further assurance that the sentiment expressed is actually tied to something on the web page display.

At a step 1124 the nouns are compared to a product related data source to check for alternative descriptors that may relate to a product or service.

At a step 1128 the results of the sentiment expressed and the associated product are stored for later analysis.

At a flow label 1130 the method ends.

One having skill in the art will appreciate that certain of these steps may be simplified or combined to effect a more efficient operation. For example and without limitation, a sentiment engine may process each word without regard to whether it is a verb, adjective, or noun by comparing it to a data source listing all likely words in use. Moreover, new words and phrases may be identified and added to the data source for future reference. In addition, there are publically available sentiment engines which may also be employed to effect some embodiments.

Besides sentiment analysis, users may also be characterized by involvement in embedded chat sessions. For example and without limitation, certain users may be active participants using a wide variety and frequency of high sentiment words, while other users may rarely post. Correlations between users posts, sentiment value and purchase likelihood may be tracked to further aid sentiment analysis. A user who merely write "I like it." and then purchases, may be given more sentiment weight than a user who writes "This is awesome, I love it!" and rarely, if ever purchases. Certain embodiments of a sentiment engine may adjust a user post's sentiment value based on the historic sentiment rating of the posting user. In real-time (or pseudo real-time) analysis a user's sentiment rating may be augmented or reduced from a raw sentiment value.

Some embodiments may also include running totals of sentiment per chat room or group. Collectively the chat room members form a dynamic congregation with a common interest about the object of the contextualized chat session. For example and without limitation, a chat room may have multiple users expressing both likes and dislikes of a product or service. The aggregated total sentiment score for the chat room will indicate the degree of that congregation's feelings. Running averages and trends could also be calculated based on the more recent postings and may include adjustments for individual user's historic sentiment valuation.

Cross Advertising

For a given dynamic demographic, advertisers may also promote products and services on the web page where a chat widget is operating. For example and without limitation, some embodiments may advertise complementary products when triggers reach a specific value or range of values. If the product is an upcoming concert and the dynamic demographic is highly favorable to the band or type of music, a music promoter from a similar genre may advertise an upcoming performance by a group with similar characteristics. Or a hotel near the music venue might promote specials hoping some of the music enthusiasts opt for staying in the hotel after a concert.

In some embodiments the users them selves may negotiate cross-promotional activities and acquire permissions to set triggers for promotional activity on products and services that are associated with different sellers. For example and without limitation, two sellers may agree to allow each other to promote their products on each others web sites using the chat widget described herein. Accordingly they would be granted sufficient permissions and be given appropriate controls to effect those promotions. One user allows another user to set triggers and run promotion on the user's web page.

User Portal

Certain embodiments may incorporate a user portal for product and service providers to manage setting for their promotional activity. The portal provides not only controls for a product/service provider, but provides a platform for operation between multiple product/service providers. Without limitation, operation of the portal may provide one or more of the following:

Management of trigger points;
Management of sentiment valuation;
Management of sentiment value word and criteria;
Management of cross-promotional activities;
Communications between product/service providers to arrange cross-promotional activities, and
Suggestions of other product/services that may provide cross-promotional opportunities.

One having skill in the art will recognize that the user portal functions may be effectuated by exposing the portal functions as a web service or through various APIs thus allowing for these control functions to be incorporated into higher level software or other web sites.

Reports

The results of the chat and promotional activity may be reported using both static and interactive reporting tools. A report engine controls what data is available to which user. A user may login to an administration portal and be given options to view results from operations as disclosed herein. Without limitation, some embodiments may include one or more of the following in the reporting operations:

Color for expressing sentiment of the users;
A heat map where the individual values contained in a matrix are represented as colors showing popularity, sentiment, users and the like;
Interactive charting wherein users can click through to the underlying data;
Popularity of product/service types across a product line or a product line from several vendors;
Heat index to trigger analysis, and
Trigger to user purchase analysis showing the affect of trigger point advertisement.

Reporting may be effectuated using queries to a data source containing a history of the activity of the chats and related purchases and user activities. The queries result in data for display which may be displayed using standard graphical controls or commercial reporting tools.

The above illustration provides many different embodiments or embodiments for implementing different features of the invention. Specific embodiments of components and processes are described to help clarify the invention. These are, of course, merely embodiments and are not intended to limit the invention from that described in the claims.

Although the invention is illustrated and described herein as embodied in one or more specific examples, it is nevertheless not intended to be limited to the details shown, since various modifications and structural changes may be made therein without departing from the spirit of the invention and within the scope and range of equivalents of the claims. Accordingly, it is appropriate that the appended claims be construed broadly and in a manner consistent with the scope of the invention, as set forth in the following claims.

What is claimed is:

1. A system comprising:
at least one processor coupled to a network;
a chat management engine coupled to said network, said chat management engine operative to:
embed one or more chat widgets in a plurality of web pages based on the web page content and the web page's unique URL;
receive a context indication from a plurality of users, each of said users interacting with a web page having a unique URL, said context indication associated with at least a part of the web page content;
assign the users to a chat room, based on the context indication and the unique URL;
receive chat messages from the widgets, said messages associated with a web page context;
exchange those messages among a plurality of users in their respective chat rooms,
a sentiment engine operable to calculate a sentiment value for the chat messages, and;
a promo engine operable to alter a price for a product or service, adding a product or service, or removing a product or service in response to the sentiment value.

2. The system of claim 1 wherein the sentiment is calculated on a per user basis or on an entire congregation.

3. A method including:
transmitting processor instructions to a plurality of discrete URL addresses, said instructions operable to present one or more chat interfaces on one or more unique web pages, each chat interface associated with a contextualized image,
wherein the contextualized image is contextually related the to one or more unique web pages,
receiving chat messages from said chat interfaces, said chat messages associated with said image;
directing the chat messages to unique chat rooms, said directing controlled by the discreet URL, the image, and the number of users assigned to the chat rooms;
coordinating the exchange of said chat messages with a plurality of users,
calculating a sentiment value of said chat messages, and;
modifying the contextualized image in response to the sentiment value
wherein said modifying includes at least one of:
altering the price for the object the contextualized image represents,
altering a product or service offered for the object the contextualized image represents, or
removing a product or service.

4. The method of claim 3 wherein the instructions are included in either an HTML file or an XML file.

5. The method of claim 4 wherein the file includes multiple contextualized images and each contextualized image is associated with a separate chat interface.

6. The method of claim 3 wherein the sentiment value is calculated for at least one of either an individual user or a congregation of users.

7. The method of claim 6 further including:
calculating a sentiment value of said chat messages;
comparing the sentiment value to a predetermined trigger value, and
transmitting new information in response to said comparing.

8. The method of claim 7 wherein the trigger value includes at least one or both of a time and date value.

9. The method of claim 7 wherein the trigger value includes an event.

10. One or more processor readable storage devices having non-transitory processor readable code embodied thereon for programming one or more processors to perform a method comprising:

transmitting processor instructions to a plurality of discrete URL addresses, said instructions operable to present one or more chat interfaces on one or more unique web pages, each chat interface associated with a contextualized image, wherein the contextualized image is contextually related to the one or more unique web pages, receiving chat messages from said chat interfaces, said chat messages associated with said image;

directing the chat messages to unique chat rooms, said directing controlled by the discreet URL, the image, and the number of users assigned to the chat rooms, coordinating the exchange of said chat messages with a plurality of users, calculating a sentiment value of said chat messages, wherein said sentiment value is calculated for at least one of either an individual user or a congregation of users, and modifying the contextualized image in response to the sentiment value, wherein said modifying includes at least one of:

altering the price for the object the contextualized image represents, altering a product or service offered for the object the contextualized image represents, or removing a product or service for the object the contextualized image represents.

11. The storage device of claim 10 wherein the instructions are included in either an HTML file or an XML file, said file including multiple contextualized images and each image associated with a separate chat interface.

12. The storage device of claim 10 wherein the chat interface includes indicia representative of the user.

13. The storage device of claim 12 wherein the indicia is related to a social network web page.

* * * * *